(12) United States Patent
Freiman et al.

(10) Patent No.: US 7,688,021 B2
(45) Date of Patent: Mar. 30, 2010

(54) FUEL CELL AND BATTERY SYSTEMS

(75) Inventors: Joseph F. Freiman, Cypress, TX (US);
Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 11/213,210

(22) Filed: Aug. 26, 2005

(65) Prior Publication Data

US 2007/0046250 A1 Mar. 1, 2007

(51) Int. Cl.
*H01M 10/44* (2006.01)
*H02J 7/00* (2006.01)
*H01M 8/04* (2006.01)
*H02J 1/10* (2006.01)

(52) U.S. Cl. ........... 320/101; 320/138; 320/132; 429/22; 429/23; 307/44; 307/60

(58) Field of Classification Search ........... 320/101, 320/138; 429/22
See application file for complete search history.

(56) References Cited

U.S. PATENT DOCUMENTS

| | | | |
|---|---|---|---|
| 6,590,370 B1* | 7/2003 | Leach | 323/299 |
| 2002/0095247 A1 | 7/2002 | Ding et al. | |
| 2004/0174072 A1 | 9/2004 | Bourilkov et al. | |
| 2004/0183501 A1* | 9/2004 | Ozeki | 320/101 |
| 2004/0224209 A1 | 11/2004 | Ninomiya et al. | |
| 2005/0040785 A1* | 2/2005 | Barnes et al. | 320/101 |

* cited by examiner

*Primary Examiner*—Patrick J Assouad
*Assistant Examiner*—Yalkew Fantu (57) ABSTRACT

In at least some embodiments, a system comprises a load and a fuel cell coupled to said load, the fuel cell being configured to provide a constant power level to said load. The system further comprises a battery coupled to said load and configured to provide power in excess of said constant power level to said load, if needed by said load.

21 Claims, 6 Drawing Sheets

FUEL CELL AND BATTERY SYSTEMS

BACKGROUND

Industry is actively seeking efficient methods and systems to power portable electronic devices. For some time, replaceable batteries or rechargeable batteries have been implemented to power portable devices when an alternating current (AC) power outlet is not available. More recently, fuel cells are being developed as a power source for portable devices.

When operating, fuel cells are effective at supplying an approximately constant power level. However, some electronic devices demand a variable amount of power. For example, a laptop computer demands a variable amount of power based on user configurations, applications being executed, components in use or other parameters. Thus, in order for a fuel cell to power such a device, the fuel cell would need to be sized to output the device's maximum or "peak" power demand. Such an implementation undesirably increases the size and cost of the fuel cell.

In addition, different portable devices have different peak power demands and different configurations to receive power. Thus, a fuel cell designed to power one device may not be compatible with another device or may not efficiently power another device.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As disclosed herein, embodiments of the invention are directed to methods and systems for powering an electronic device. In at least some embodiments, a system comprises a device load, an integral device battery and a fuel cell. The integral device battery is capable of meeting the device power requirements, but is limited in the amount of energy (i.e., run-time) it can provide. The fuel cell is capable of providing a maximum continuous power that may or may not be sufficient to meet the variable power requirements of the device load. Thus, embodiments of the invention provide various ways of utilizing the integral device battery to meet the intermittent peak power requirements of an electronic device's load. Embodiments of the invention also re-direct the excess power developed by the fuel cell toward charging the integral device battery, if the device load is below the maximum continuous power output of the fuel cell.

In at least some embodiments, the integral device battery and the fuel cell are connected in parallel to a variable load of the electronic device such that the fuel cell provides a continuous power source and the battery provides a variable power source (e.g., a source that powers peak loads). In some embodiments, the fuel cell is configured to plug into an alternating current (AC) adapter jack of the electronic device. Thus, the device receives power from the fuel cell as if the fuel cell were an AC adapter. Connecting the fuel cell to the device reduces the drain on the battery and, thus, extends the time that the device is powered without plugging the device into an AC power outlet.

Figure 1:
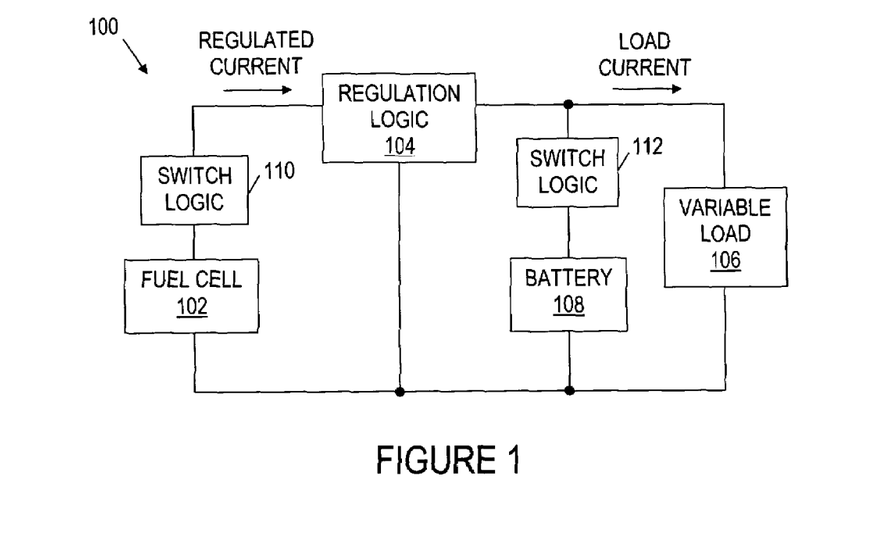
FIG. 1 shows a simplified circuit diagram of system 100 in accordance with embodiments of the invention.

FIG. 1 shows a simplified circuit diagram of a system 100 in accordance with embodiments of the invention. As shown in FIG. 1, the system 100 comprises a fuel cell 102, a battery 108 and a variable load 106 coupled in parallel. The fuel cell 102 selectively couples to the battery 108 and to the variable load 106 via switch logic 110 and regulation logic 104 which may be a linear converter, a direct current to direct current (DC-DC) converter or another converter. The battery 108 also couples to the variable load 106 via switch logic 112.

In operation, the variable load 106 draws a "load current" that is supplied from the battery 108 and, if the fuel cell 102 is connected, from the fuel cell 102. In some embodiments, the load current comprises a fixed or regulated amount of current drawn from the fuel cell 102 and, if needed, a variable amount of current drawn from the battery 108. The regulated current from the fuel cell 102 is drawn by the regulation logic 104 when the switch logic 110 provides a connection. In at least some embodiments, the switch logic 110 comprises a manual switching mechanism such as a plug-in connector. Additionally or alternatively, the switch logic 110 comprises logic (e.g., hardware or software-implemented logic) that selectively provides a connection based on timing, electrical measurements or other considerations.

If the regulated current from the fuel cell 102 is less than the load current demanded by the variable load 106, the battery 108 provides the remaining current (i.e., $current_{battery} = current_{load} - current_{fuel\ cell}$). Alternatively, if the regulated current provided by the fuel cell is greater than the load current demanded by the variable load 106, the extraneous current from the fuel cell 102 charges the battery 108. To prevent overcharging, the switch logic 112 is used. For example, in some embodiments, the switch logic 112 disconnects the battery 108 from the regulation logic 104 and from the variable load 106 if the regulated current is greater than the load current and if the battery 108 is charged. In such embodiments, the battery 108 is able to power the variable load 108. After the battery 108 has been drained for a threshold amount of time or has been drained by a threshold amount, the battery 108 is again connected to the regulation logic 104 enabling the fuel cell 102 to assist in providing power to the load 106 and/or to the battery 108.

In some embodiments, the output of the regulation logic 104 adapts to the voltage level of the battery 108 (or the voltage level needed by the variable load 106). In this manner, the regulated current from the fuel cell 102 is provided to the variable load 106 without significantly affecting the voltage level to the variable load 106. Also, if the regulation logic 104 determines that the load current drawn by the variable load 106 drops below a predetermined threshold level (e.g., if a device represented by the variable load 106 is powered off, is placed in a "sleep" state or enters another low-power mode), the regulation logic 104 reduces or minimizes the regulated current drawn from the fuel cell 102.

Although system 100 shows the switch logic 110 on the input side of the regulation logic 104, alternative embodiments may implement the switch logic 110 on the output side of the regulation logic 104. For example, if the regulation logic 104 comprises a step-up DC-DC converter, placing the switch logic 110 on the output side (where the voltage is increased compared to the input side) allows more cost-efficient switch logic 110 because current on the output side is reduced compared to current on the input side. However, if the regulation logic 104 comprises a linear converter, placing the switch logic 110 on the input side (as shown) enables the regulation logic 104 to provide an output current that accurately tracks the needs of the variable load 106 (i.e., the current output from the regulation logic is directly provided to the variable load 106). At any rate, the switch logic 110 could be located on either the input side or the output side of the regulation logic 104, although some types of regulation logic favor an input side implementation and others favor an output side implementation.

Figure 2:
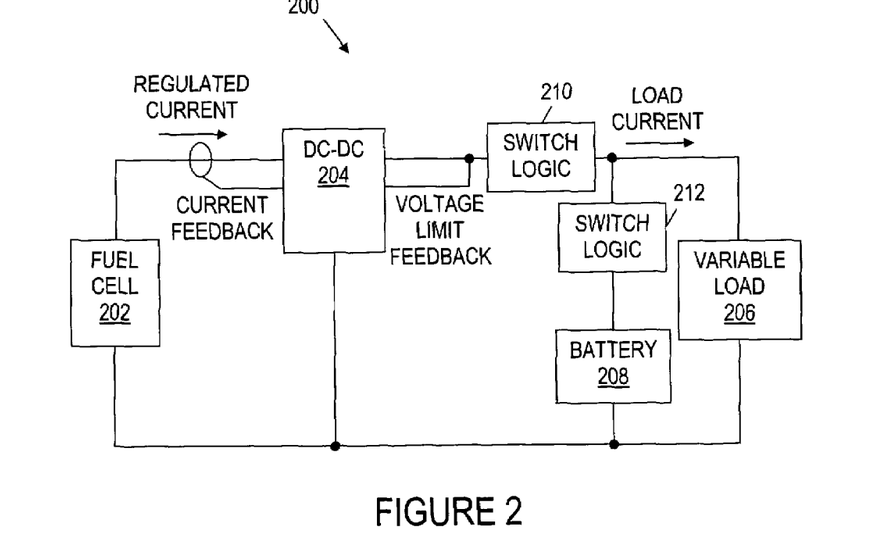
FIG. 2 shows a simplified circuit diagram of another system 200 in accordance with embodiments of the invention.

FIG. 2 shows another circuit diagram of a system 200 in accordance with alternative embodiments of the invention. As shown in FIG. 2, the system 200 comprises a fuel cell 202, a battery 208 and a variable load 206 coupled in parallel. The fuel cell 202 couples to the battery 208 and the variable load 206 via a DC-DC converter 204 and switch logic 210. The battery 208 also couples to the variable load 206 via switch logic 212. The switch logic 210 and 212 comprise any suitable switching mechanism such as manual-based switches, electromechanical-based switches or electronic-based switches.

In at least some embodiments, the switch logic 210 and the switch logic 212 detect certain events and close (i.e., enable current flow) or open (i.e., stop current flow) accordingly. For example, in some embodiments, either the switch logic 210 or the switch logic 212 may be configured to detect if the regulated current is greater than the load current and if the battery 208 is fully charged, respectively. In such case, one of switch logic 210 and 212 is configured to open while the other is configured to close. Additionally or alternatively, the DC-DC converter 204 is configured to adapt its voltage output level to prevent overcharging the battery 208 and/or to prevent damaging the switch logic 210, the switch logic 212 or components of the variable load 206.

As shown, the DC-DC converter 204 is configured to receive "current feedback" regarding the regulated current from the fuel cell 202. The DC-DC converter 204 is also configured to receive "voltage feedback" regarding the voltage at the output of the DC-DC converter 204. Based on the current feedback and the voltage feedback, the DC-DC converter 204 regulates power to the variable load 206 and/or to the battery 208. For example, using the voltage feedback, the DC-DC converter 204 ensures that the voltage at the output of the DC-DC converter 204 is never greater than a predetermined threshold voltage. Otherwise, the switch logic 210, the switch logic 212, the battery 208 or components of the variable load 206 could be damaged as previously mentioned.

If the DC-DC converter 204 determines that the load current drawn by the variable load 206 drops below a predetermined threshold level (e.g., if a device represented by the variable load 206 is powered off, is placed in a "sleep" state or enters another low-power mode), the DC-DC converter 204 reduces or minimizes the regulated current drawn from the fuel cell 202.

If the fuel cell 202 outputs less power than the variable load 206 requires, the switch logic 210 and 212 connect the fuel cell 202, the battery 208 and the variable load 206 in a parallel configuration. In some embodiments, the voltage at the output of the DC-DC converter 204 is approximately the battery voltage such that the fuel cell 202 and the DC-DC converter 204 perform as a current source. Thus, the fuel cell 202 is able to power some of the variable load 206 and the battery 208 powers the remainder of the variable load 206 (including peak loads).

Figure 3:
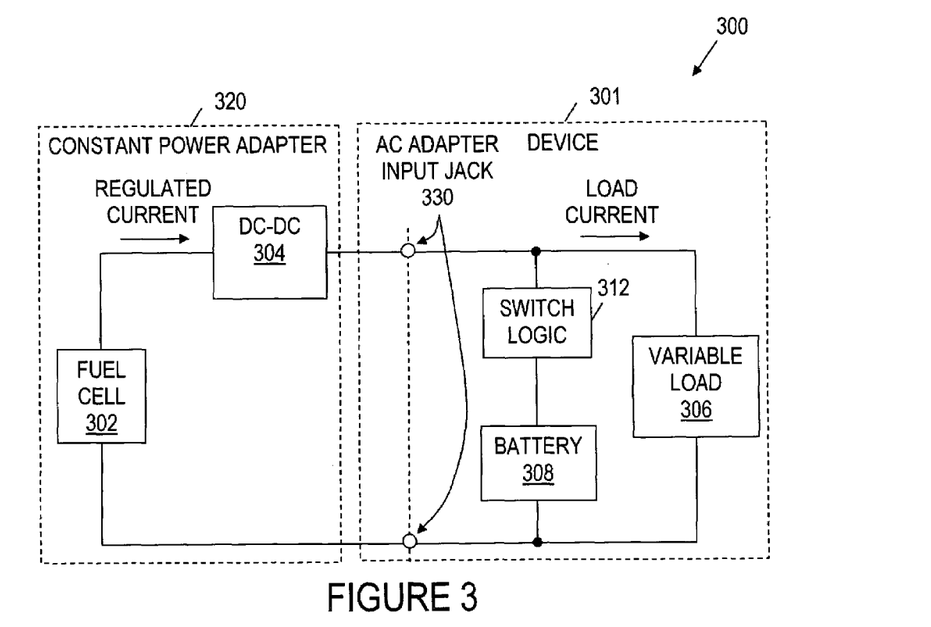
FIG. 3 shows a system in accordance with embodiments of the invention.

FIG. 3 illustrates another system 300 in accordance with alternative embodiments of the invention. As shown in FIG. 3, the system 300 comprises a device 301 having a battery 308 coupled in parallel to a variable load 306 via switch logic 312. The device 301 further comprises an AC adapter input jack 330 configured to couple to an AC adapter for powering the device 301. In at least some embodiments, the device 301 is configured to receive power from a constant power AC adapter. A constant power AC adapter can provide variable amounts of power up to a predetermined maximum power. Once this maximum power limit is reached, the output power remains constant between specified voltage and current limits of the AC adapter.

The system 300 further comprises a power adapter 320 that comprises a fuel cell 302 coupled to a DC-DC converter 304. The power adapter 320 is configured to mimic (imitate) a constant power AC adapter and selectively couples to the AC adapter input jack 330 of the device 301. For example, if an AC power outlet is not available, a user may choose to couple the power adapter 320 to the AC adapter input jack 330 to increase the amount of time that the device 301 receives power and/or to charge the battery 308. When the power adapter 320 couples to AC adapter input jack 330, a source of constant power is provided to the device 301 by causing the DC-DC converter 304 to draw a fixed or regulated amount of current from the fuel cell 302. This assumes the voltage across the fuel cell 302 remains approximately constant as the fuel cell 302 operates. If an AC power outlet is available, a user may choose to couple a "true" (or standard) constant power AC adapter (i.e., an adapter that converts AC power from an AC outlet up to a constant power for the device 301) to the AC adapter input jack 330 for powering the device 301 and/or for charging the battery 308.

The DC-DC converter 304 comprises either a step-up converter or a step-down converter based on the energy-providing capabilities of the fuel cell 302 and/or the energy needs of the device 301. The regulated current drawn from the fuel cell 302 by the DC-DC converter 304 is provided to the variable load 306 of the device 301 via the AC adapter input jack 330. In some embodiments, the load current drawn by the variable load 306 comprises a fixed current from the fuel cell 302 and a variable current from the battery 308. The voltage level provided to the variable load 306 is approximately the voltage across the battery 208, although the power adapter 320 can also be used to charge the battery. In such case, the voltage level to the variable load 306 is slightly higher than the voltage across the battery 308.

If the load current drawn by the variable load 306 is less than the regulated current drawn from the fuel cell 302 (e.g., if the device 301 is powered off or if the fuel cell 302 is capable of providing a regulated current that is greater than the load current when the device 301 is powered on), the extraneous regulated current may be used to charge the battery 308. However, if the battery 308 is already charged, it is undesirable to overcharge the battery. Therefore, the switch logic 312 may open so as not to overcharge the battery 208. Additionally or alternatively, the DC-DC converter 304 may lower its output voltage level or reduce the amount of regulated current drawn from the fuel cell 302 so as not to overcharge the battery 308.

If the power adapter 320 (or other power adapter) is not connected or is otherwise not providing power to the AC adapter input jack 330, the switch logic 312 closes to enable the battery 308 to provide power to the variable load 306. Thus, the variable load 306 may be powered by the battery 308, the fuel cell 302 or both.

In some embodiments, the DC-DC converter 304 regulates power rather than current. For example, in some embodiments, the DC-DC converter 304 draws constant power from the fuel cell 302 by measuring the voltage across the fuel cell 302 and adjusting the amount of current drawn from the fuel cell 302 accordingly. Alternatively, other techniques (e.g., the DC-DC converter 304 could measure both voltage and current to control the output power) may be implemented to output constant power from the imitation constant power adapter 320. Drawing constant power or constant current from the fuel cell 302 enables efficient and/or compatible operation of at least some fuel cell implementations.

Figure 4:
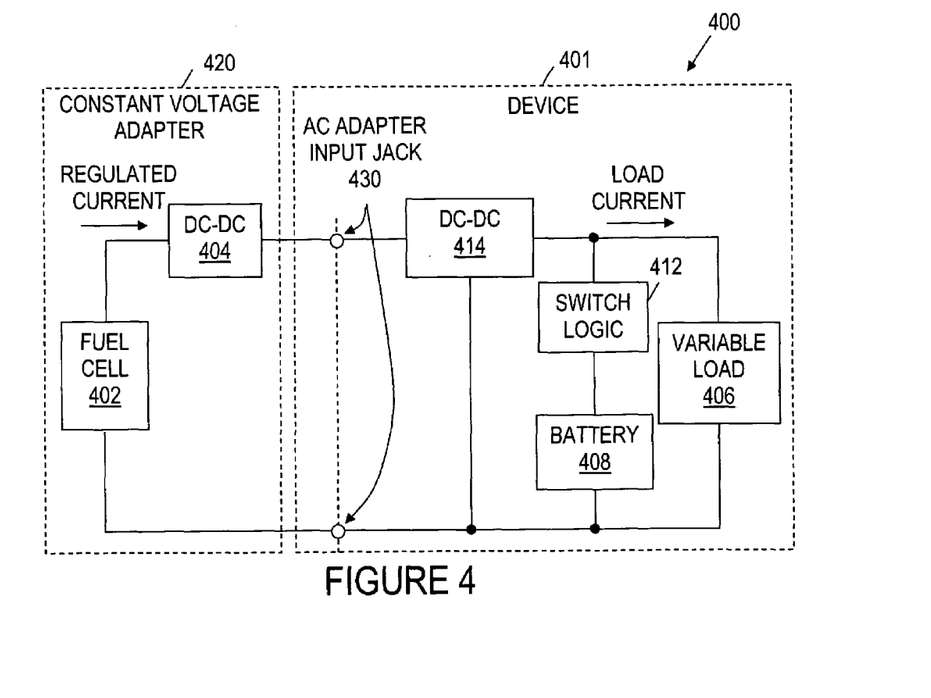
FIG. 4 shows another system in accordance with alternative embodiments of the invention.

FIG. 4 illustrates another system 400 in accordance with alternative embodiments of the invention. As shown in FIG. 4, the system 400 comprises a device 401 having a battery 408 coupled in parallel to a variable load 406 via switch logic 412. In this way, the power architecture of the device 401 is similar to the device 301 previously described in FIG. 3. However, the device 401 is configured to receive constant voltage as input rather than constant power. Thus, the device 401 further comprises a DC-DC converter 414 coupled to the battery 408 via the switch 412 and to the variable load 406. The DC-DC converter 414 selectively adjusts an input voltage (selected from one or more voltage levels) to regulate power to the variable load 406 and/or to charge the battery 408.

As shown, the device 401 further comprises an AC adapter input jack 430 configured to couple to an AC adapter for powering the device 401. In at least some embodiments, the device 401 is configured to receive power from a constant voltage AC adapter.

The system 400 further comprises a voltage adapter 420 that comprises a fuel cell 402 coupled to a DC-DC converter 404. The voltage adapter 420 is configured to mimic (imitate) a constant voltage AC adapter and selectively couples to the AC adapter input jack 430 of the device 401. For example, if an AC power outlet is not available, a user may choose to couple the voltage adapter 420 to the AC adapter input jack 430 to increase the amount of time that the device 401 receives power and/or to charge the battery 408. When the voltage adapter 420 couples to AC adapter input jack 430, a source of constant voltage is provided to the device 401 by causing the DC-DC converter 404 to draw a regulated amount of current from the fuel cell 402. If an AC power outlet is available, a user may choose to couple a "true" (or standard) constant voltage AC adapter (i.e., an adapter that converts AC power from an AC outlet to a constant voltage for the device 401) to the AC adapter input jack 430 for powering the device 401.

The DC-DC converter 404 comprises either a step-up converter or a step-down converter based on the energy-providing capabilities of the fuel cell 402 and/or the energy needs of the device 401. Also, the DC-DC converter 414 comprises either a step-up converter or a step-down converter. In at least some embodiments, the DC-DC converter 414 comprises a step-down converter that lowers an input voltage (from either the imitation constant voltage adapter 420 or from a true constant voltage adapter) to one or more voltage levels configured to provide power to the variable load 406 and/or to charge the battery 408.

The system 400 operates similarly to the system 300 previously described, wherein, if the load current drawn by the variable load 406 is less than the regulated current drawn from the fuel cell 402, the extraneous regulated current may be used to charge the battery 408. Also, one or more techniques to prevent overcharging the battery 408 may be implemented as described previously regarding the battery 308 of FIG. 3. If the imitation constant voltage adapter 420 (or other power adapter) is not connected or is otherwise not providing power to the AC adapter input jack 430, the switch logic 412 is configured to close such that the battery 408 is able to provide power to the variable load 406.

Also, as previously described for the DC-DC converter 304 of FIG. 3, the DC-DC converter 404 may be configured to regulate power rather than current. Drawing constant power or constant current from the fuel cell 402 enables efficient and/or compatible operation of at least some fuel cell implementations.

Figure 5:
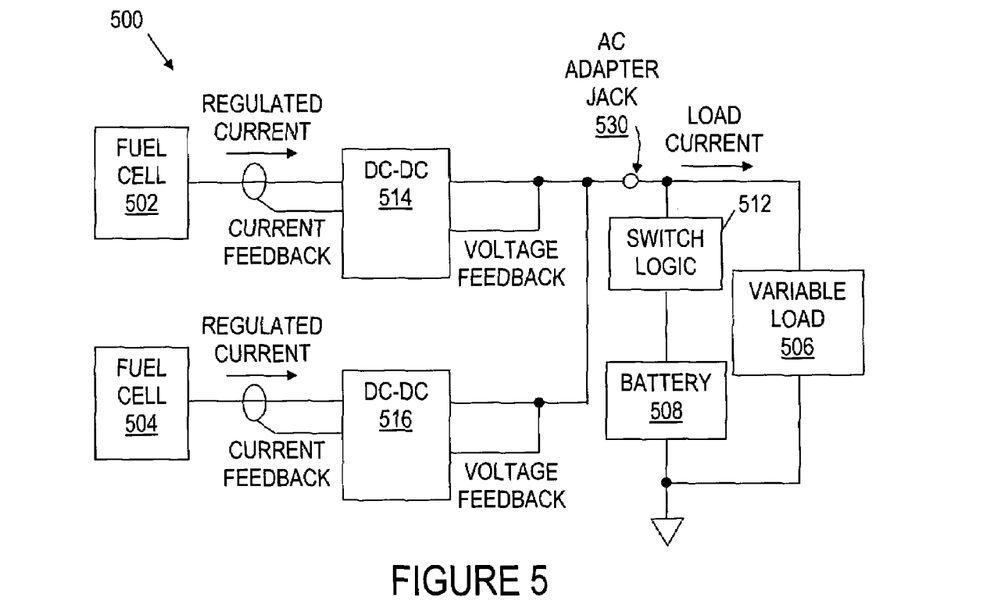
FIG. 5 shows another system in accordance with alternative embodiments of the invention.

FIG. 5 shows another system 500 in accordance with alternative embodiments of the invention. As shown, the system 500 comprises a plurality of fuel cells 502, 504, each fuel cell being associated with a DC-DC converter 514, 516 respectively. The system 500 further comprises a battery 508 coupled in parallel to a variable load 506 via switch logic 512.

In some embodiments, the DC-DC converters 514, 516 are each configured to have a voltage output that is approximately the voltage across the battery 508. Thus, each fuel cell and associated DC-DC converter imitate a current source (i.e., a non-changing current is intended to be drawn from the fuel cells 502 and 504 for powering the variable load and/or battery). For example, if the power consumed by the variable load 506 ranges between 10-30 Watts, the fuel cells 502, 504 may comprise 10-Watt fuel cells. Thus, the fuel cells 502, 504 (and associated DC-DC converters 514, 516) are able power the variable load 506 (at approximately the designated voltage level of the battery 508) without help from the battery 508, except when the variable load 506 consumes more than 20 watts. In such case, the battery 508 is configured to provide the additional power to the variable load 506.

As shown, each DC-DC converter 514, 516 may regulate power to the variable load 506 based on current feedback at the input and voltage feedback at the output. In some embodiments, the regulated current from the fuel cells 502, 504 may be provided to the variable load 506 via an AC adapter jack 530. Alternatively, another jack that provides a parallel connection to the battery 508 and to the variable load 506 could be implemented. Also, the system 500 may implement techniques to charge the battery 508 and to prevent overcharging the battery 508 as previously described in connection with FIGS. 3 and 4.

There is no limitation to the number or configuration of fuel cells and associated DC-DC converters that may be used to power the variable load 506 as described above. For example, the configuration of fuel cells may be selected based on the cost of fuel cells, the availability of fuel cells, the size of fuel cells, the output wattage of fuel cells or the compatibility of fuel cells with a particular device. In some embodiments, each fuel cell 502, 504 is configured to provide a different amount of power (e.g., the fuel cell 502 may be configured to provide 10 Watts and the fuel cell 504 may be configured to provide 15 Watts). Also, each fuel cell 502, 504 and associated DC-DC converter 514, 516 is configured to selectively connect to a plurality of devices. Thus, a plurality of different fuel cells (and associated DC-DC converters) may be mixed-and-matched to efficiently power different devices.

Figure 6:
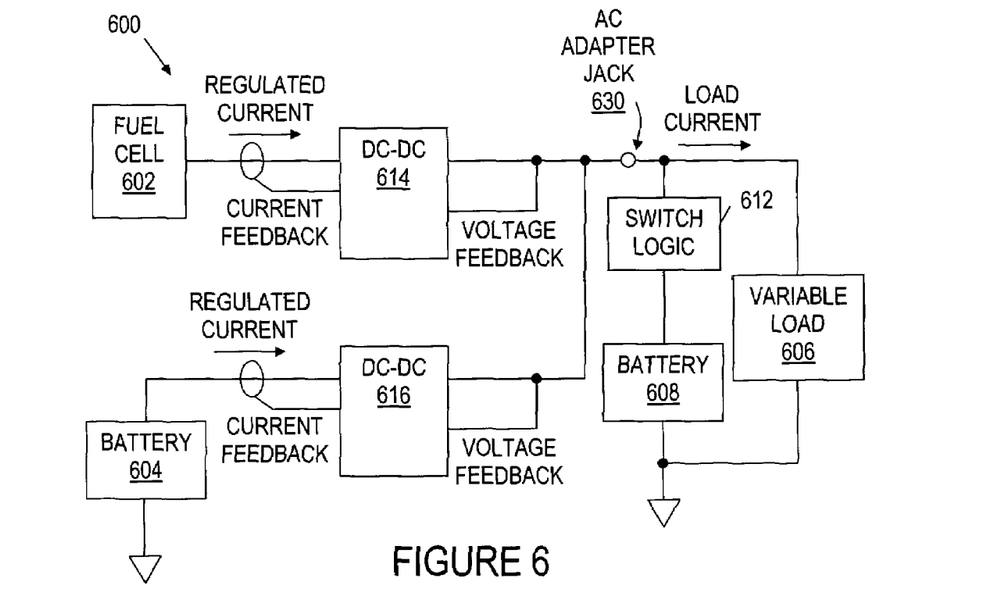
FIG. 6 shows another system in accordance with alternative embodiments of the invention.

FIG. 6 shows another system 600 in accordance with alternative embodiments of the invention. The system of FIG. 6 is similar to the system 500 of FIG. 5, but implements at least one additional battery 610 having an associated DC-DC converter 616 as well as at least one fuel cell 602 having an associated DC-DC converter 614. Thus, the system 600 illustrates that a combination of external batteries and fuel cells having associated DC-DC converters can be used to provide power to a variable load 606. In such embodiments, each DC-DC converter regulates current from a fuel cell (e.g., the fuel cell 602) or from a battery (e.g., the battery 610) to provide a current source to the variable load 606. The plurality of current sources may be provided to the variable load 606 via an AC adapter jack 630 or another jack that provides a parallel connection to the battery 608 and to the variable load 606. The output voltage of each DC-DC converter is approximately the voltage across the battery 608. The system 600 also may implement techniques to charge the battery 608 and to prevent overcharging the battery 608 as previously described in connection with FIGS. 3 and 4.

Figure 7:
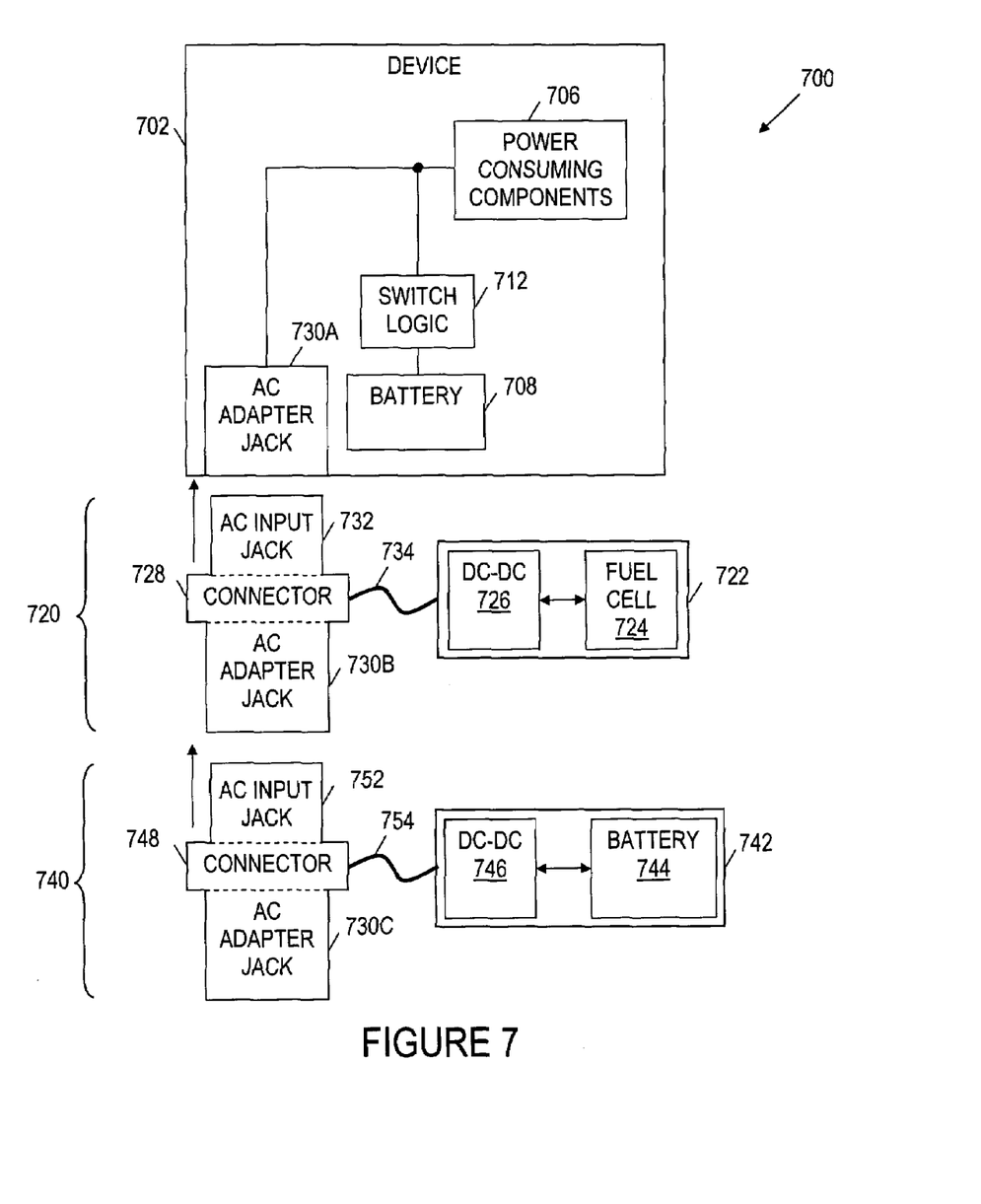
FIG. 7 shows another system in accordance with alternative embodiments of the invention.

FIG. 7 shown another system 700 in accordance with embodiments of the invention. As shown in FIG. 7, the system 700 comprises a device 702 having power consuming components 706 coupled to a battery 708 via switch logic 712. The power consuming components 706 also couple to an AC adapter jack 730A.

The system 700 further comprises a fuel cell assembly 720 and a battery assembly 740. The fuel cell assembly 720 comprises a package 722 that houses a fuel cell 724 coupled to a DC-DC converter 726. The fuel cell assembly 720 further comprises a connector 728 coupled to the package 722 via a conductive cable 734. The connector 728 has an AC input jack 732 configured to removeably connect to an AC adapter jack such as the AC adapter jack 730A of the device 702. The connector 728 also has an AC adapter jack 730B which is similar to the AC adapter jack 730A. The AC adapter jack 730B enables an additional fuel cell assembly or a battery assembly (e.g., the battery assembly 740) to couple to the device 702 via the connector 728.

The battery assembly 740 is similar to the fuel cell assembly 720, but implements a battery 744 rather than a fuel cell. As shown, the battery assembly 740 comprises a package 742 that houses the battery 744 and a DC-DC converter 746 coupled to the battery 744. The battery assembly 740 further comprises a connector 748 coupled to the package 742 via a conductive cable 754. The connector 748 has an AC input jack 752 configured to removeably connect to an AC adapter jack such as the AC adapter jack 730A or the AC adapter jack 730B. The connector 728 also has an AC adapter jack 730C which is similar to the AC adapter jacks 730A and 730B. By connecting AC input jacks to AC adapter jacks, a plurality of fuel cell assemblies or battery assemblies are able to couple to the device 702 and provide power thereto.

In at least some embodiments, the power consuming components 706 consume a variable amount of power. In such embodiments, a regulated amount of power is provided to the power consuming components 706 by each fuel cell assembly and each battery assembly coupled to the device 702. If the power consuming components 706 require more power than is provided by the fuel cell assemblies and/or the battery assemblies, the battery 708 is able to provide power to the power consuming components 706. If the power consuming components 706 require less power than is provided by the fuel cell assemblies and/or the battery assemblies, the battery 708 may be charged. In some embodiments, overcharging the battery 708 is prevented as previously described (e.g., the switch logic 712 may selectively open and close to prevent overcharging the battery). By coupling fuel cell assemblies and/or battery assemblies to the device 702, the time duration by which the device 702 is powered without an AC power outlet is extendable.

If a given fuel cell assembly is running out of fuel, another fuel cell assembly can be added to continue powering the device without interrupting the device's power state. Adding a fuel cell assembly may involve unplugging the connector of the exhausted fuel cell assembly from the device 702 or may involve connecting an input jack of the additional fuel cell assembly to the AC adapter jack of the exhausted fuel cell assembly. Alternatively, fuel may be added to an exhausted fuel cell assembly as necessary. In this manner, the device 702 can be powered indefinitely without an AC power outlet. If an AC power outlet is available, a user may choose to power the device 702 and/or to charge the battery 708 using a true AC power adapter (not shown).

Figure 8:
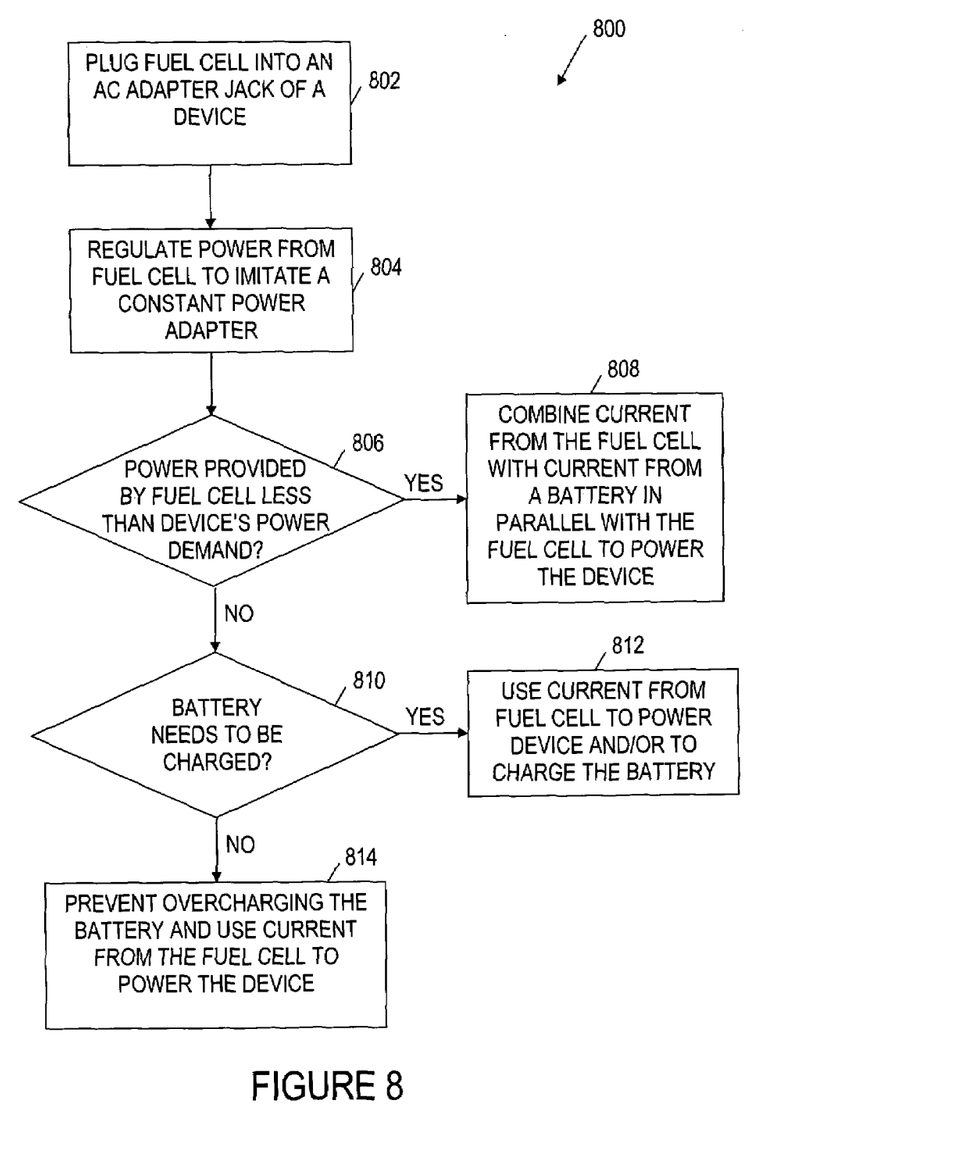
FIG. 8 shows a method in accordance with embodiments of the invention.

FIG. 8 shows a method 800 in accordance with embodiments of the invention. As shown in FIG. 8, the method 800 comprises plugging a fuel cell into an AC adapter jack of a device (block 802). The method 800 further comprises regulating power from the fuel cell to imitate a constant power adapter (block 804). If the power provided by the fuel cell is less than the device's power demand (determination block 806), current from the fuel cell is combined with current from a battery in parallel with the fuel cell to power the device (block 808). If the power provided by the fuel cell is not less than (i.e., if the power provided by the fuel cell is greater than) the device's power demand (determination block 806), a determination is made whether the battery needs to be charged (determination block 810).

If the battery needs to be charged as determined at block 810, current from the fuel cell is used to power the device and/or to charge the battery (block 812). If the battery does not need to be charged as determined at block 810, overcharging the battery is prevented and current from the fuel cell is used to power the device (block 814).

Figure 9:
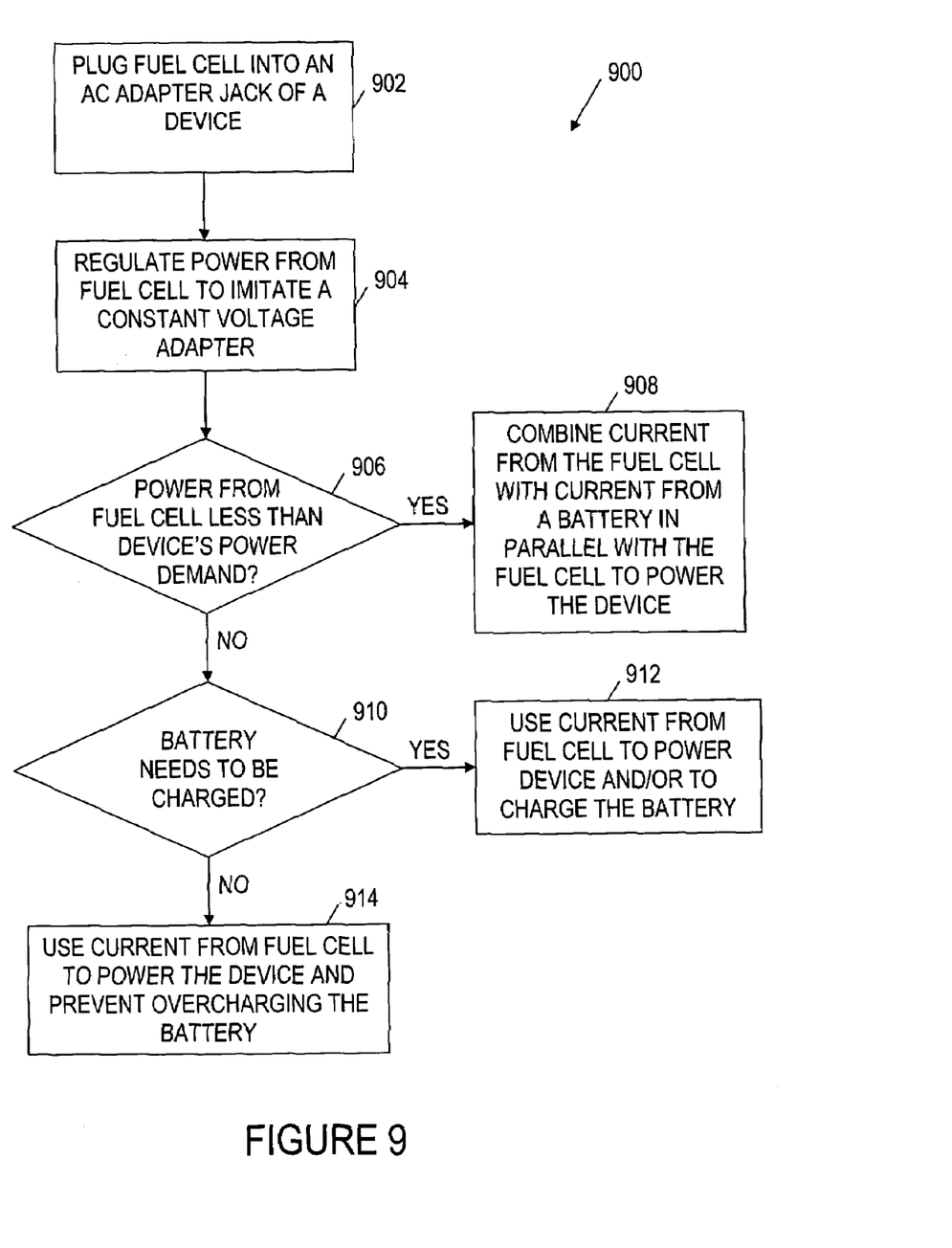
FIG. 9 shows another method in accordance with alternative embodiments of the invention.

FIG. 9 shows a method 900 in accordance with alternative embodiments of the invention. As shown in FIG. 9, the method 900 comprises the plugging a fuel cell into an AC adapter jack of a device (block 902) and regulating power from the fuel cell to imitate a constant voltage adapter (block 904). Thus, in the method 900 power is regulated from a fuel cell to imitate a constant voltage adapter and in the method 800 power is regulated from a fuel cell to imitate a constant power adapter. This difference coincides with devices that are configured differently. For example, some devices are configured for use with a constant power adapter and other devices are configured for use with a constant voltage, adapter. The remainder of the method 900 follows the process previously described for the method 800.

The above discussion is meant to be illustrative of the principles and various embodiments of the present invention. Numerous variations and modifications will become apparent to those skilled in the art once the above disclosure is fully appreciated. For example, it is possible that some embodiments may couple the fuel cell to a device via an input other than an AC adapter input jack. In such embodiments, the fuel cell couples to the battery and to the load such that power is provided to the load and, if needed, to the battery. It is intended that the following claims be interpreted to embrace all such variations and modifications.

What is claimed is:

1. A system, comprising: a load; a fuel cell coupled to said load, the fuel cell being configured to provide a constant power level to said load; and a battery coupled to said load and configured to provide power in excess of said constant power level to said load, if needed by said load; and further comprising regulation logic coupled to the fuel cell and to the load, wherein the regulation logic draws a regulated power level from the fuel cell and provides the regulated power level to the load.

2. The system of claim 1 wherein the regulation logic outputs a regulated current from the fuel cell at a voltage level associated with the battery.

3. The system of claim 1 wherein the system comprises a computer.

4. The system of claim 1 further comprising an alternating current (AC) adapter port, wherein the fuel cell couples to the load via the AC adapter port.

5. The system of claim 4 wherein the fuel cell and the regulation logic are configured to imitate a constant power AC adapter.

6. The system of claim 4 further comprising voltage converter logic coupled between the regulation logic and the load, wherein the fuel cell and the regulation logic are configured to imitate a constant voltage AC adapter.

7. The system of claim 1 wherein the fuel cell is coupled to the battery and, if the load demands less than the constant power level during run-time, selectively charges the battery.

8. A fuel cell apparatus, comprising:
a fuel cell;
regulation logic coupled to the fuel cell, the regulation logic being configured to draw a regulated amount of power from the fuel cell; and
a connector coupled to the regulation logic, wherein the connector is configured to be plugged into an alternating current (AC) adapter port of a device.

9. The fuel cell apparatus of claim 8 wherein the connector further comprises an AC adapter port that enables another fuel cell apparatus to couple to the connector.

10. The fuel cell apparatus of claim 8 wherein the regulation logic is configured to regulate power such that the fuel cell apparatus mimics a constant power AC adapter.

11. The fuel cell apparatus of claim 8 wherein the regulation logic is configured to regulate power such that the fuel cell apparatus mimics a constant voltage AC adapter.

12. The fuel cell apparatus of claim 8 wherein the regulation logic is configured to regulate power based on a current feedback from the fuel cell and a voltage feedback from the device.

13. A system, comprising: a load; a system battery coupled to the load; and a fuel cell assembly coupled to the load and to the system battery; wherein the fuel cell is configured to power the load and, if the load demands less than a threshold amount of power during run-time, to charge the system battery; and further comprising regulation logic coupled to the fuel cell assembly and to the system battery, wherein power from the fuel cell assembly is output to the load and to the system battery via the regulation logic.

14. The system of claim 13 further comprising switch logic coupled between the regulation logic and the system battery, wherein, if the regulation logic provides more current from the fuel cell assembly than is demanded by the load, the switch logic selectively enables at least some of the current to charge the system battery.

15. The system of claim 13 wherein, if the load demands more than a maximum power level provided by the fuel cell assembly, the battery is configured to provide power to the load.

16. The system of claim 13 further comprising an alternating current (AC) adapter port, wherein the fuel cell assembly couples to the load and to the system battery via the AC adapter port.

17. The system of claim 16 wherein the fuel cell assembly and the regulation logic are configured to mimic one of a constant power AC adapter and a constant voltage AC adapter.

18. The system of claim 13 further comprising at least one additional fuel cell assembly, each fuel cell assembly having a fuel cell and regulation logic, wherein each fuel cell assembly couples in parallel to the load and to the system battery to provide power to the load and, if the load demands less than a net amount of power provided from the fuel cell assemblies, to selectively charge the system battery.

19. The system of claim 13 further comprising at least one battery assembly coupled in parallel to the fuel cell, each battery assembly comprises a battery coupled to regulation logic, wherein each battery assembly is configured to provide power to the load and, if the load demands less than a net amount of power provided from the fuel cell and from each battery assembly, to charge the system battery.

20. A method, comprising: plugging a fuel cell into an AC adapter jack of a device; and selectively combining current from the fuel cell with current from an integral battery of the device to power a dynamic load of the device; and further comprising regulating power from the fuel cell to mimic a constant power AC adapter or/and a constant voltage AC adapter.

21. The method of claim 20 further comprising selectively charging the battery using the fuel cell.

* * * * *